May 7, 1963

D. A. SALMON ETAL 3,088,486

LOADING ARRANGEMENT FOR A REGULATOR

Filed Nov. 5, 1959

INVENTOR.
DOUGLAS A. SALMON
DONALD B. SALMON
BY
Norman N. Holland
ATTORNEY

May 7, 1963 D. A. SALMON ETAL 3,088,486
LOADING ARRANGEMENT FOR A REGULATOR
Filed Nov. 5, 1959 2 Sheets-Sheet 2
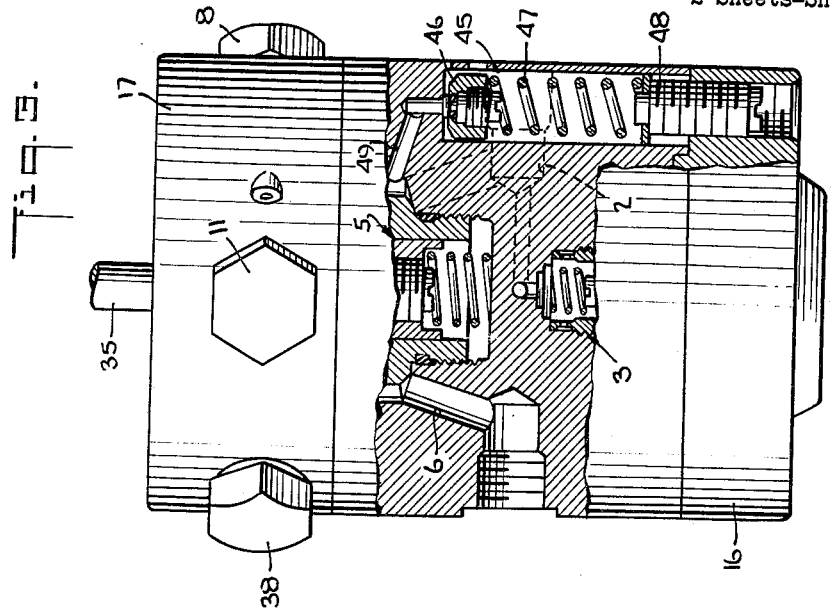
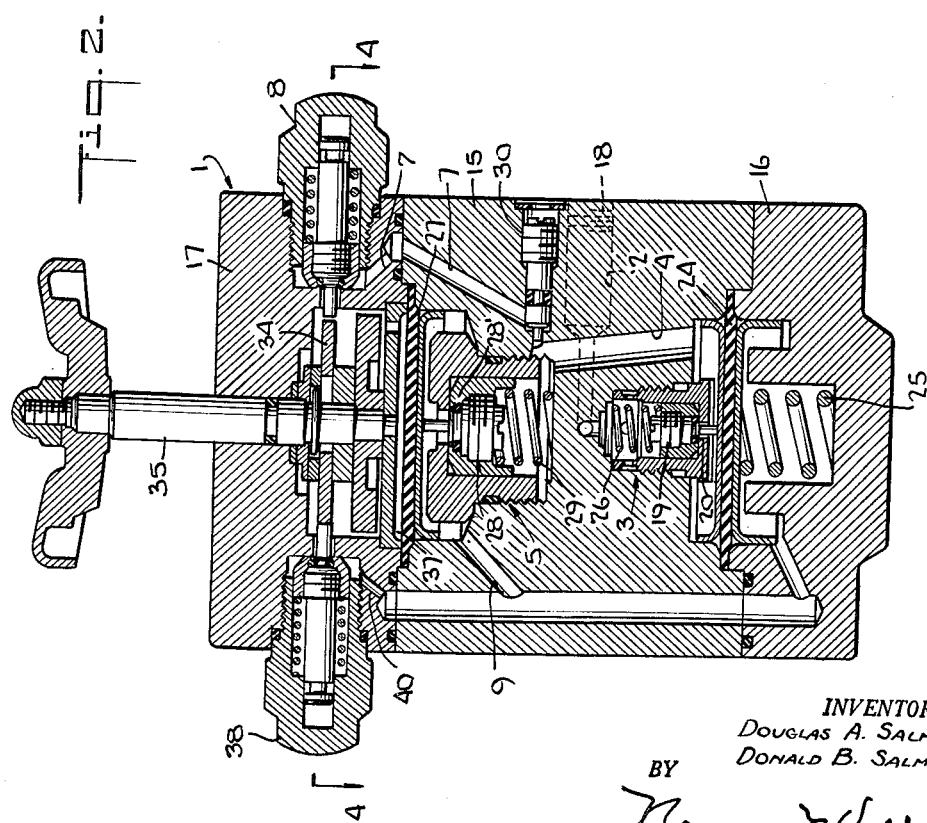
INVENTORS
DOUGLAS A. SALMON
DONALD B. SALMON
BY
Norman H. Holland
ATTORNEY United States Patent Office 3,088,486
Patented May 7, 1963

3,088,486
LOADING ARRANGEMENT FOR A REGULATOR
Douglas A. Salmon, Harrington Park, and Donald B. Salmon, Englewood, N.J., assignors to Hoke Incorporated, Cresskill, N.J., a corporation of New York
Filed Nov. 5, 1959, Ser. No. 851,138
2 Claims. (Cl. 137—505)

The present invention relates to a pressure regulator and more particularly to an adjustable multiple stage pressure regulator having a unitary control assembly.

It is necessary in many modern distribution and supply systems for gases at high pressure to have a means for reducing and regulating the gas pressure wherein a relatively large reduction in pressure is used and wherein the regulated output pressure is held within relatively narrow limits. At present such reducing and regulating is accomplished by the use of several regulators in series or by the use of a unitary regulator having two or more stages with a variety of separate control means for the various stages.

Where several adjustments must be made in a high pressure system it is relatively difficult to provide for rapid and precise adjustment of the output pressure particularly where a relatively large pressure drop is required. Even in present systems wherein the control is relatively simple, the pressure regulators having large drops such as 10 to 20 times or more have been found to have outputs which vary over relatively wide limits as the load requirements for the pressure regulator vary during the various loading conditions to which the systems are subjected.

There is also a need at present for compact pressure regulators in systems requiring large pressure drops and where space and weight allowances are small. In the present systems wherein two stages are necessary and wherein separate housings are provided for the various stages, the systems tend to be unduly bulky. Where attempts have been made to reduce the size of multiple stage systems, it has been found that a sacrifice in the output accuracy is necessary so that the final output pressure varies over undesirably large ranges.

Accordingly it is an object of the present invention to provide a pressure regulator adapted to operate with large pressure reductions and to simultaneously provide a compact, easily controlled unit in the form of a unitary assembly which has closely regulated output characteristics.

Another object of the present invention is to provide a compact and easily adjustable pressure regulator.

Another object of the present invention is to provide a multiple stage regulator housed in a unitary assembly.

Another object of the present invention is to provide a pressure regulator of relatively small dimensions which is capable of large pressure reductions and which has excellent control characteristics.

Another object of the present invention is to provide a two stage regulator with a unitary control system.

Another object of the present invention is to provide an improved pressure regulator adapted for applications having large pressure reductions.

Another object of the present invention is to provide a pressure regulator with an improved integral relief valve.

Other and further objects of the present invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 2 is a vertical sectional view of a preferred embodiment of a pressure regulator of the present invention taken along line 2—2 of FIG. 5;

FIG. 5 is a top plan view of the pressure regulator of FIG. 2 illustrating the unitary control;

The operation of the pressure regulator will first be described generally with particular reference to the schematic diagram of FIG. 1. The elements shown schematically in FIG. 1 are preferably all included in the unitary pressure regulator assembly illustrated in the preferred embodiment of FIGS. 2–6 as will be more fully described below.

Figure 1:
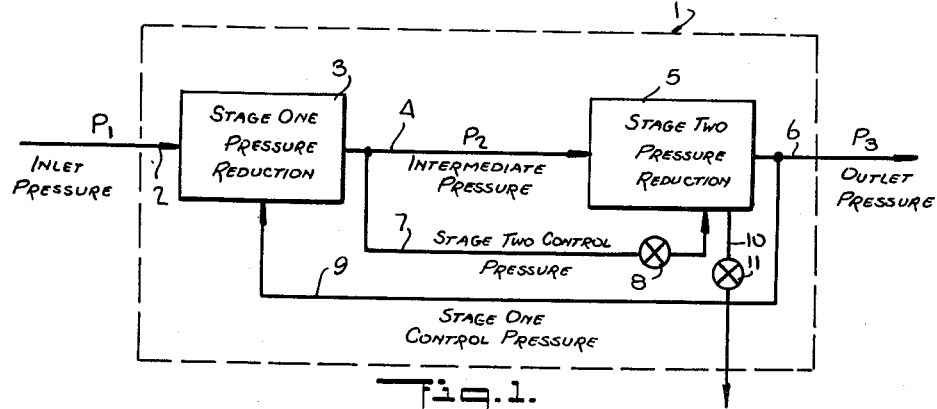
FIG. 1 is a schematic diagram of the regulator of the invention.

In the schematic diagram of FIG. 1 the pressure regulator indicated at 1 has an inlet port 2 adapted to connect the regulator to a source of gas at high pressure indicated as P1. The inlet channel 2 communicates with a first stage pressure regulator indicated generally at 3. The first stage pressure regulator comprises an automatic regulator which reduces the input pressure P1 to a constant intermediate pressure P2. The gas in the output channel 4 of the first stage is thus at the intermediate pressure P2. The output conduit 4 of the first stage connects through channel 4 to a second stage pressure regulator indicated generally at 5. The second stage pressure regulator 5 is adjustable to further reduce the gas pressure at its outlet 6. The outlet pressure P3 is set at the desired amount for the system connected to the pressure regulator 1.

In the preferred embodiment of applicants' valve the second stage pressure regulator 5 is a dome type diaphragm regulator in which, as will be more fully described below, the output pressure is controlled by a diaphragm which is loaded by gas admitted to the dome from the first stage output 4 by conduit 7 through control valve 8. Sufficient gas is admitted from the conduit 4 at the intermediate pressure P2 through channel 7 and valve 8 to set the output pressure P3 for the second stage 5 at its desired level.

In order to keep the differential pressure between the intermediate pressure P2 and the output pressure P3 at a minimum, the intermediate pressure P2 is automatically maintained at a slight increment above the output pressure P3. This is done by including a dome-type diaphragm pressure control means in the first stage 3 and by providing the control pressure for this diaphragm by a direct connection conduit 9 between the outlet 6 and the first stage 3 pressure control diaphragm. As will be more fully described below in a detailed description of the pressure regulator a minimum intermediate pressure spring 25 is provided to insure a desired intermediate pressure P2 for an initial zero output pressure P3. Thereafter as the output pressure P3 is increased by the control valve 8, the interconnection 9 between the outlet 6 and the first stage dome will cause the intermediate pressure P2 to rise at the same rate as the output pressure P3. This automatically insures a constant differential pressure across the second stage 5 of the pressure regulator of an amount equal to initial pressure P2 as set by the intermediate pressure spring. This pressure for example may be set at 150 p.s.i. even though the input pressure P1 may be as much as several thousand pounds per square inch and the output pressure P3 may be any value up to within 150 p.s.i. of the inlet pressure P1. In other words the final sensitive pressure regulation is performed across the second stage 5 at a controlled low constant differential pressure from a few pounds per square inch to several thousand pounds per square inch. When it is desired to reduce the output pressure P3 or reset the regulator the dome pressure in the second stage 5 is released to the atmosphere through the release channel 10 and the valve 11 as will be more fully described below.

The above regulator which has been described generally in connection with the schematic diagram of FIG. 1 will now be described in greater detail with specific reference to FIGS. 2 through 6 which illustrate a preferred embodiment of the pressure regulator 1 housed in a single unitary assembly.

Figure 6:
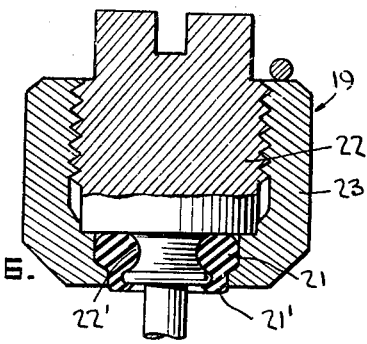
FIG. 6 is an enlarged detailed sectional view of a preferred embodiment of the regulator valve seat.

The above described pressure reduction stages, channels, and control valves are formed or mounted in three principle sections of the regulator 1 comprising a regulator body 15 having a bottom plate 16 and a top plate 17. As best illustrated in FIGS. 2 and 6 an inlet channel 2 is formed in the regulator body 15 having a suitable threaded connection 18 adapted for connection to a source of gas and communicating at its inner end with the first stage 3.

The first stage 3 comprises a pressure regulator of the diaphragm type with a combined gas dome and main spring control. Thus, a valve member 19 seals the valve port 20 with an O-ring 21 (FIG. 6) mounted on a seal holder 22 by a seal holder cap 23. The O-ring 21 is mounted in a retaining groove 22' and has its sealing portion 21' forced or bulged outwardly by the cap 23. The valve member 19 engages a diaphragm 24 which urges the valve member 19 to its open position under the force of the intermediate pressure spring 25. The spring 25 is set to provide a regulated initial intermediate pressure P2 in outlet 4 and conduit 7. A marginal spring 26 above the valve member 19 provides the marginal valve closing force.

The gas at intermediate pressure P2 flows through the outlet 4 to the second regulator stage 5 mounted in the body 15 and the top plate 17.

The second regulator stage 5 is also of the diaphragm type with a diaphragm 27 controlling the valve member 28 and marginal spring 29. A sealing ring 28' similar to ring 21 (FIG. 6) is provided to seal the valve member 28 in its closed position. As described above the dome regulating pressure for the second regulator stage 5 is obtained from the gas outlet 4 for the first regulator stage 3. The connection is made through a metering valve 30, conduit 7 and control valve 8. The control for the valve 8 comprises a cam wheel 34 mounted for rotation by a centrally mounted control handle 35.

Figure 4:
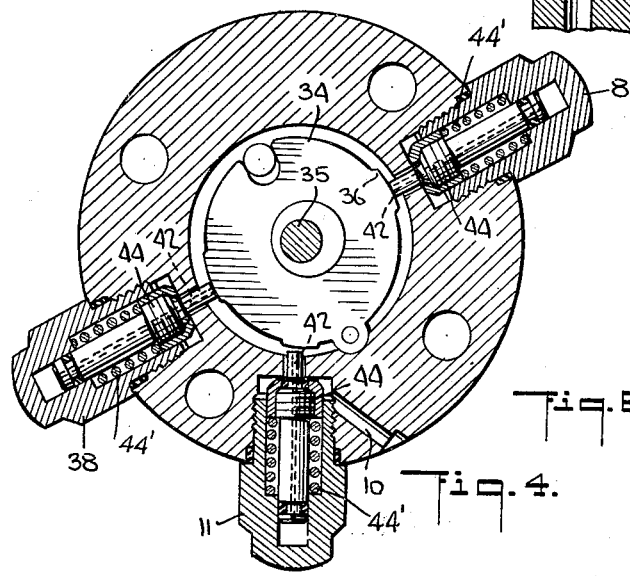
FIG. 4 is a horizontal sectional view of the pressure regulator of FIG. 2 taken along line 4—4 of FIG. 2.

As illustrated in FIG. 4, rotation of the handle 35 causes the raised portions 36 of cam wheel 34 to open control valve 8 thereby admitting gas to the dome 37 above diaphragm 27. The control valve 8 is left open until the output pressure reaches its desired value.

The gas from the second stage 5 at the outlet pressure P3 passes through outlet 6 to the load system.

In order to provide a constant differential pressure across the second regulator stage 5, the output 6 of the second regulator stage 5 is connected to the first regulator stage 3 to provide its dome pressure. The diaphragm 24 is proportioned so that the output pressure is added to the initial intermediate pressure P2. For example, where the output pressure P3 is 5 p.s.i., an initial intermediate pressure P2 setting of 150 p.s.i. would be automatically raised to 155 p.s.i. Where a 2,000 p.s.i. output pressure was required with the same initial intermediate pressure setting P2, the intermediate pressure would adjust itself to 2,150 p.s.i. In each case the differential pressure across the important second stage regulator 5 is constant at 150 p.s.i. so that excellent output pressure control characteristics are obtained over a wide range of output pressure values. The above pressure values are typical and others may be used.

In order to reset the regulator and to reduce the output pressure P3 to a lower value, it is necessary to reduce the dome pressures of the regulator stages. Two bleed valves 11 and 38 are provided for this purpose in the preferred embodiment. The bleed valve 38 initially connects the dome 37 to the output line 6 to provide a safe and controlled initial release through conduits 9 and 40. The second bleed valve 11 vents the domes to the atmosphere through conduit 10 (FIG. 4).

In the preferred embodiment the control handle 35 is used to control the output adjustment valve 8 as well as the bleed valves 11 and 38 as illustrated in FIG. 4. Clockwise rotation of the cam wheel 34 opens the output pressure control valve 8 and counterclockwise rotation first opens the bleed valve 38 to the output line 6 and thereafter opens the valve 11 to bleed the domes directly to the atmosphere. This provides a convenient unitary control and also insures a correct sequence in the bleeding operation to prevent an initial bleeding of the dome pressures directly to the atmosphere which is undesirable for high dome pressures. Each of the valves 8, 11 and 38 use O-ring seals similar to that illustrated in FIG. 6 as indicated in FIG. 4.

As illustrated in FIG. 4, the valves 8, 11 and 38, in the top plate 17 preferably have a conduit 42 through the valve stems 44 to equalize the gas forces on the opposite sides of the stems. This conduit in the bleed to atmosphere valve 11 permits a significant reduction in the strength of the closing spring 44' since the valve stem then is essentially balanced even though pressure differentials across the closed stem seal may be several thousand p.s.i.

The provision of the conduit 42 in the dome pressure setting valve 8 acts to release high pressure trapped in the conduits 7 and 4 when the output pressure is reduced. If gas at high pressure remains in these conduits it makes subsequent setting of the regular difficult as this gas tends to increase the dome pressure above the value which may be required when valve 8 is again reopened.

The conduit 42 in the valve 38 improves the regulator action where sudden pressure drops may occur in the output end. Without the balancing conduit 42 the pressure drop causes the higher dome pressure to open the valve 38 so that dome pressure is lost and the output pressure P3 drops accordingly.

Figure 3:
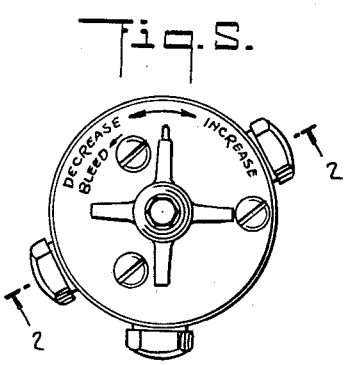
FIG. 3 is a side elevational view partially in section of the pressure regulator of FIG. 2.

A relief valve 45 is illustrated in FIG. 3 which opens at an adjustable pressure to protect against dangerously high outlet pressures. The sealing member 46 is held in its closed positions by the spring 47. The adjustable spring stop 48 is screwed to the desired position to cause the sealing member 46 to exhaust gas from the second stage 5 through outlet 49 when the pressure of the gas in the outlet 6 rises above the value set for the relief valve operation.

Figure 7:
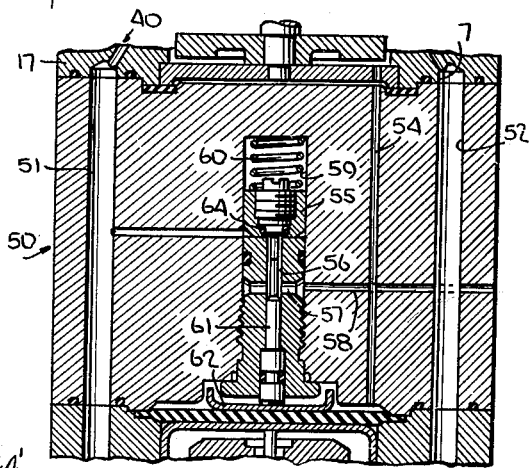
FIG. 7 is a sectional view of a tracking relief valve attachment adapted for combination with the pressure regulator of FIG. 2.

Another embodiment of an improved pressure relief system for the pressure regulator 1 is illustrated in FIG. 7. This pressure relief system 50 is adapted to be inserted into the above described pressure regulator 1 as an integral unit and as seen in FIG. 7 the pressure relief system 50 is inserted between the body portion 15 and the top plate 17. Suitable channels 51 and 52 are provided to connect the conduit 7 and the conduit 40 so that the insertion of the pressure relief system 50 does not otherwise alter the above described pressure regulating action. A conduit 54 is also provided to admit the dome pressure gas to the diaphragm 27 from the regular output pressure setting valve 8. The pressure relief system 50 includes a valve member 55 which vents the outlet 6 to the atmosphere through the conduits 56, 57 and 58 when the output pressure P3 rises a predetermined amount above the output pressure for which the second stage is set. The valve member 55 is slidably mounted in a suitable hollow center portion 59 and it is held in its closed position by a spring member 60. A pin 61 extends downwardly from the valve member 55 to engage a supplemental thrust plate 62 which is slidably fitted on the top of the diaphragm 27. The pin 61 and the thrust plate 62 are positioned in the hollowed out portion 59 at such a point that the valve member 55 opens when the diaphragm 27 is raised a predetermined amount above its normal closing position for the second stage regulator 5. Thus, if the outlet pressure in the outlet 6 rises a predetermined amount such as 20 pounds, for example, above the desired outlet pressure, the diaphragm 27 will be raised above its regular shut-off position for the second stage 5 and this additional lifting of diaphragm 27 slides the pin 61 and valve member 55 upwardly thereby opening the seal 64 and permitting the gas in the outlet line 6 to vent to the atmosphere through conduits 56, 57 and 58. This pressure relief system 50 is therefore independent of the particular outlet pressure at which the regulator is operated and it will act to relieve the outlet pressure whenever the pressure rises a predetermined amount above the particular outlet pressure for which the regulator is set.

It will be seen that an improved multi-stage regulator has been provided which combines a novel intercoupling of the stages to provide an improved regulator and easy control with a compact unitary housing which simplifies the control and which makes the regulator suitable for numerous uses where a compact and rugged regulator is required. The unitary housing for the stages permits the various conduits and control valves to be closely spaced and the control valves for setting the regulator functions to be connected to one principle control member. The novel intercoupling between the stages of the regulator also provides for a constant pressure differential across the final regulator output stage so that a constant and low pressure differential across this stage may be used at all values of outlet pressure whereby the accuracy of the outlet pressure is improved and whereby the accuracy is made independent of the particular outlet pressure used over the entire range of the regulator. In addition the unitary regulator construction also provides for integral relief valves to protect the load system and a pressure relief valve has been provided which is automatically controlled by the outlet pressure and which provides pressure relief at a predetermined amount above the particular outlet pressure setting used.

The pressure regulator also incorporates an improved valve seat means in combination with the unitary housing and the pressure relief system to further insure accuracy of output pressure control and to insure reliability in the regulator operations.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a pressure regulator having an inlet and an outlet, a device for controlling the supply of compressible fluid to and from a chamber communicating with one surface of a control diaphragm of the pressure regulator comprising the combination of a passage communicating from said inlet to said chamber, a control valve in said passage, a first bleed valve mounted in a passage between said chamber and said outlet operable to connect said chamber with the opposite surface of said diaphragm, a second bleed valve mounted in a passage between said chamber and atmosphere operable to vent said first chamber to the atmosphere, and a single movably mounted control member for selectively engaging said three valves for opening said control valve when moved in one direction and for successively opening said first bleed valve and then said second bleed valve when moved in another direction.

2. The device as claimed in claim 1 in which certain of said valves have a spring loaded stem, and a conduit therethrough for equalizing the fluid pressure on opposite ends thereof.

References Cited in the file of this patent

UNITED STATES PATENTS

| | | |
|---|---|---|
| 2,047,101 | Grove | July 7, 1936 |
| 2,212,709 | Grove | Aug. 27, 1940 |
| 2,662,348 | Jacobsson | Dec. 15, 1953 |
| 2,761,464 | Faust | Sept. 4, 1956 |
| 2,770,252 | Bass | Nov. 13, 1956 |
| 2,861,561 | Kreuger | Dec. 17, 1957 |
| 2,861,588 | Cronk | Nov. 25, 1958 |
| 2,893,687 | Huthsing | July 7, 1959 |
| 2,920,862 | Beard | Jan. 12, 1960 |
| 2,940,462 | Johanson | June 14, 1960 |
| 2,963,040 | Zimmer | Dec. 6, 1960 |
| 2,971,537 | Kowalski | Feb. 14, 1961 |